(12) United States Patent
Charas

(10) Patent No.: US 6,781,960 B1
(45) Date of Patent: Aug. 24, 2004

(54) WIRELESS MULTI-POINT COMMUNICATION SYSTEM HAVING AUTOMATICALLY-UPDATED SECTOR-BASED ROUTING CAPABILITIES

(75) Inventor: Philippe Charas, Upplands-Väsby (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/504,882

(22) Filed: Feb. 16, 2000

(51) Int. Cl.[7] .............................................. H04L 12/28
(52) U.S. Cl. ...................................... 370/255; 370/351
(58) Field of Search ................................ 370/252, 351, 370/352, 398, 395.21, 254, 255

(56) References Cited

U.S. PATENT DOCUMENTS

| | | | |
|---|---|---|---|
| 5,036,518 A | | 7/1991 | Tseung |
| 5,042,027 A | * | 8/1991 | Takase et al. ................ 370/252 |
| 5,455,568 A | * | 10/1995 | Ichihashi et al. ....... 340/825.02 |
| 5,602,841 A | * | 2/1997 | Lebizay et al. .............. 370/413 |
| 5,809,431 A | | 9/1998 | Bustamante et al. |
| 5,886,989 A | * | 3/1999 | Evans et al. ................. 370/350 |
| 5,991,630 A | | 11/1999 | Charas |
| 6,081,518 A | * | 6/2000 | Bowman-Amuah ......... 370/352 |
| 6,301,482 B1 | * | 10/2001 | Shohara ....................... 455/452 |
| 6,356,537 B1 | * | 3/2002 | Jaakkola et al. ............. 370/338 |
| 6,418,327 B1 | * | 7/2002 | Carey et al. ................. 455/562 |
| 6,426,814 B1 | * | 7/2002 | Berger et al. ................ 370/351 |
| 6,477,369 B1 | * | 11/2002 | Moghe et al. ............... 370/316 |

FOREIGN PATENT DOCUMENTS

EP  0 917 320  5/1999

* cited by examiner

Primary Examiner—Chi Pham
Assistant Examiner—Keith M. George

(57) ABSTRACT

A multi-point to multi-point system includes a plurality of multi-point nodes. Each of the multi-point nodes includes a transmitter that broadcasts over at least one sector, a receiver that receives broadcasts over the sectors, a router, and a memory. Sector identifiers corresponding to each sector are stored in the memory and broadcast over their respective sectors. A link routing table is stored in the memory and is used to inform the router of available communication paths for the multi-point node based on receipt of at least one sector identifier from another multi-point node. A root multi-point node that communicates with at least one of the multi-point nodes includes a memory that stores at least one sector identifier. The sector identifier is communicated to at least one of multi-point nodes. A root node link routing table is stored in the memory that includes contents of link routing tables from all of the plurality of multi-point nodes.

46 Claims, 5 Drawing Sheets

FIG. 4

| SECTOR 2 ROUTING TABLE (218) | | |
|---|---|---|
| MP NODE ID | SECTOR | LINK QUALITY |
| 220 | 18 | HIGH |
| 220 | 17 | HIGH |
| 220 | 16 | MEDIUM |
| 220 | 15 | LOW |
| 221 | 3 | MEDIUM |
| 221 | 4 | HIGH |
| 221 | 5 | HIGH |
| 221 | 6 | MEDIUM |
| 212 | 7 | MEDIUM |
| 212 | 8 | HIGH |
| 212 | 9 | LOW |

FIG. 5

| ROUTING TABLE (ROOT NODE) | | | | |
|---|---|---|---|---|
| MP NODE ID | SECTOR | NEIGHBOR MP NODE ID | SECTOR | LINK QUALITY |
| 218 | 2 | 220 | 18 | HIGH |
| 218 | 2 | 220 | 17 | HIGH |
| 218 | 3 | 220 | 16 | MEDIUM |
| 218 | 4 | 220 | 15 | LOW |
| 218 | 4 | 221 | 3 | MEDIUM |
| 218 | 5 | 221 | 4 | HIGH |
| 218 | 5 | 221 | 5 | HIGH |
| 218 | 6 | 221 | 6 | MEDIUM |
| 218 | 7 | 212 | 7 | MEDIUM |
| 218 | 7 | 212 | 8 | HIGH |
| 218 | 10 | 212 | 9 | LOW |
| 212 | 1 | 218 | 7 | LOW |
| 212 | 3 | 218 | 8 | MEDIUM |
| 212 | 5 | 218 | 9 | HIGH |
| 212 | 2 | 213 | 10 | MEDIUM |
| 212 | 4 | 213 | 11 | HIGH |
| 212 | 10 | 213 | 12 | LOW |
| 213 | 4 | 212 | 1 | HIGH |
| 213 | 7 | 212 | 2 | MEDIUM |
| 213 | 10 | 212 | 3 | HIGH |
| 213 | 12 | 221 | 18 | MEDIUM |
| 213 | 3 | 221 | 1 | MEDIUM |
| ⋮ | ⋮ | ⋮ | ⋮ | ⋮ |

WIRELESS MULTI-POINT COMMUNICATION SYSTEM HAVING AUTOMATICALLY-UPDATED SECTOR-BASED ROUTING CAPABILITIES

BACKGROUND

The present invention relates generally to radiocommunication systems and, more particularly, to techniques and structures for multi-point to multi-point communications.

The growth of commercial communication systems and, in particular, the explosive growth of cellular radiotelephone systems worldwide, has compelled system designers to search for ways to increase system capacity and flexibility without reducing communication quality beyond consumer tolerance thresholds. Mobile calls for example, may be routed in a circuit switched fashion, a packet switched fashion, or some hybrid thereof. It has become increasingly desirable to couple and to integrate mobile cellular telephone networks, for instance a GSM network, to Internet protocol (IP) networks for call routing purposes. The routing of voice calls over IP networks is frequently termed "voice over IP" or, more succinctly, VoIP.

Packet-switched technology, which may be connection-oriented (e.g., X.25) or "connectionless" as in IP, does not require the set-up and tear-down of a physical connection, which is in marked contrast to circuit-switched technology. This reduces the data latency and increases the efficiency of a channel in handling relatively short, bursty, or interactive transactions. A connectionless packet-switched network distributes the routing functions to multiple routing sites, thereby avoiding possible traffic bottlenecks that could occur when using a central switching hub. Data is "packetized" with the appropriate end-system addressing and then transmitted in independent units along the data path. Intermediate systems, sometimes called routers, stationed between the communicating endsystems systems make decisions about the most appropriate route to take on a per packet basis. Routing decisions are based on a number of characteristics, including: least-cost route or cost metric; capacity of the link; number of packets waiting for transmission; security requirements for the link; and intermediate system (node) operational status.

An exemplary point-to-point packet routing system (also referred to as a Local Multi-point Distribution Service (LMDS) system) is illustrated in FIG. 1. The LMDS system 100 provides wireless access to fixed networks. The LMDS system 100 includes a number of cells, each of which include a corresponding node 102, 103, 104 (e.g., a base station). The nodes 102, 103, 104 are each connected to a network 106, which may be a computer network, a cable television network or a public switched telephone network. Point-to-point interconnections or other transmission links could be used in place of the network 106 to nodes 102, 103, 104. The nodes 102, 103, 104 transmit and receive packets to communication devices such as mobile telephone devices used by multiple users 108.

In the above LMDS system, since each node 102, 103, 104, can communicate only with the users in its transmission range or with the network 106, a network or node failure will result in undeliverable packets. For example, if the link 107 between node 103 and the network 106 fails, then all packets directed to the users 108 within the transmission range of node 103 will not be delivered. In addition, since there is only link 107 between the node 103 and the network 106, an increase in packet traffic may exceed the transport capacity of the link 107. Further, the above LMDS system cannot be easily modified by adding nodes during, for example, a temporary node failure or a sudden increase in packet traffic due to, for example, a stadium or arena event or a disaster site.

SUMMARY

The present invention overcomes the above-identified deficiencies in the art by providing a method and system for multi-point to multi-point communication.

According to a first aspect of the present invention, provided is a multi-point to multi-point system including a plurality of multi-point nodes. Each of the multi-point nodes includes a transmitter that broadcasts over at least one sector; a receiver that receives broadcasts over the sectors; a router; and a memory. Sector identifiers corresponding to each sector are stored in the memory and broadcast over their respective sectors. A link routing table is stored in the memory and informs the router of available communication paths for the multi-point node based on receipt of at least one sector identifier from another multi-point node. A root multi-point node that communicates with at least one of the multi-point nodes includes a memory that stores at least one sector identifier. The sector identifier is communicated to at least one of multi-point nodes. A root node link routing table is stored in the memory that includes contents of link routing tables from all of the plurality of multi-point nodes.

According to another aspect of the present invention, a multi-point node is provided. The multi-point node includes a transmitter that broadcasts over at least one sector and a receiver which receives broadcasts over the at least one sector. The multi-point node also includes a router and a memory. Sector identifiers corresponding to respective sectors are stored in the memory and broadcast over its corresponding sector. The receiver receives at least one sector identifier each corresponding to a sector of another multi-point node. A link routing table, based on receipt of the at least one sector identifier, is stored in the memory and informs the router of available communication paths for the multi-point node.

According to another aspect of the present invention, a method of operating a multi-point mode is provided. The method includes maintaining a link routing table in each of a plurality of multi-point nodes. Each link routing table includes a sector identifier and a link quality field of all sectors of neighboring multi-point nodes which have a link quality above a predetermined threshold. Each of the link routing tables is transmitted to a root multi-point node.

According to another aspect of the present invention, a method of operating a multi-point mode is provided. The method includes receiving a signal from at least one sector of at least one other multi-point node and measuring the link quality of the received signal. The sector identifier and the link quality values for each received signal is stored in a link routing table if the link quality exceeds a predetermined threshold value. The link routing table is then sent to a root multi-point node.

BRIEF DESCRIPTION OF THE DRAWINGS

The above objects and features of the present invention will be more apparent from the following description of the preferred embodiments with reference to the accompanying drawings, wherein:

FIG. 4 illustrates a link routing table for a multi-point node according to exemplary embodiments of the present invention; and FIG. 5 illustrates a link routing table for a root multi-point node according to exemplary embodiments of the present invention.

DETAILED DESCRIPTION

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention.

Figure 1:
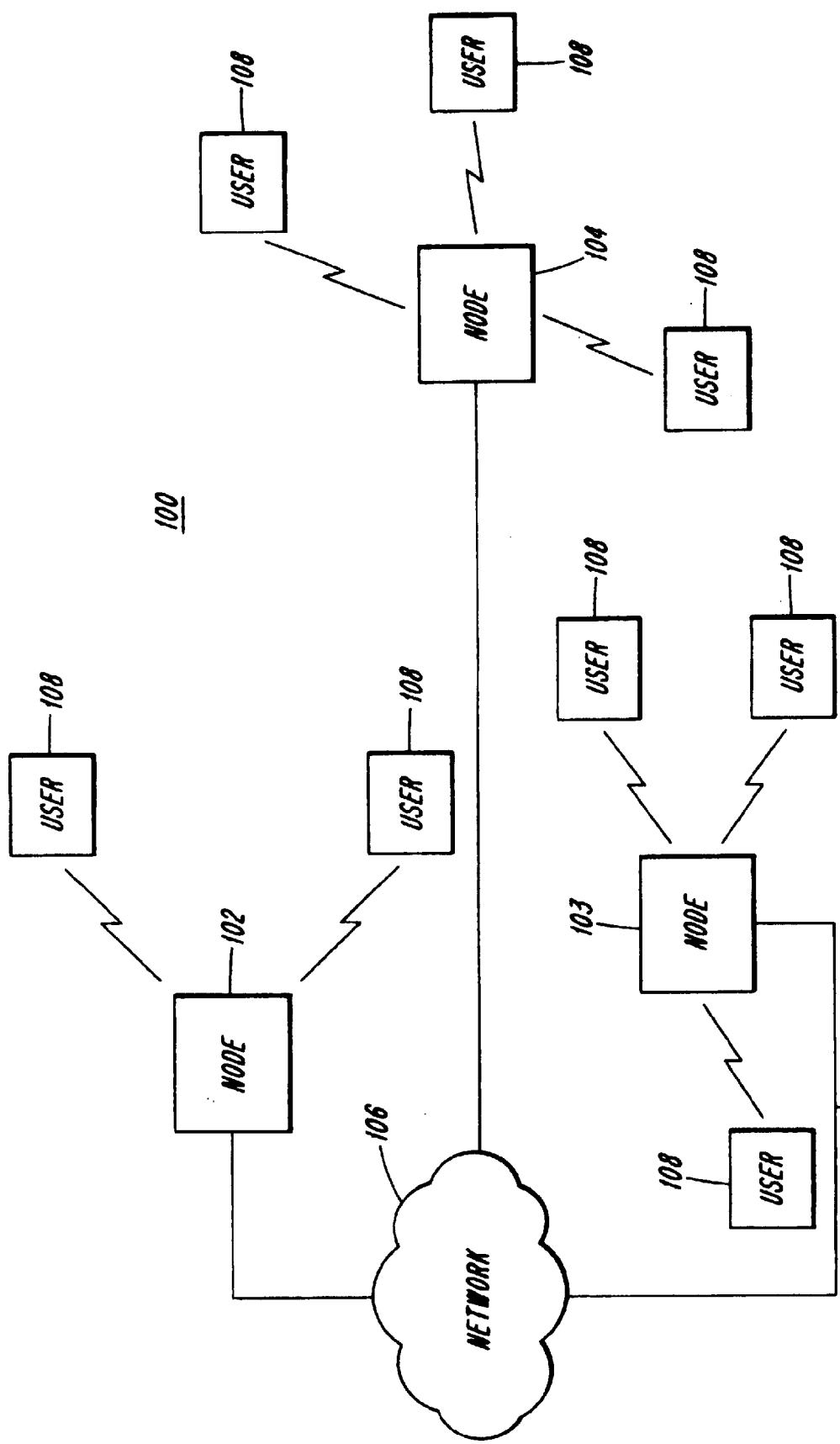
FIG. 1 illustrates a conventional point to multi-point communication system.
Figure 2:
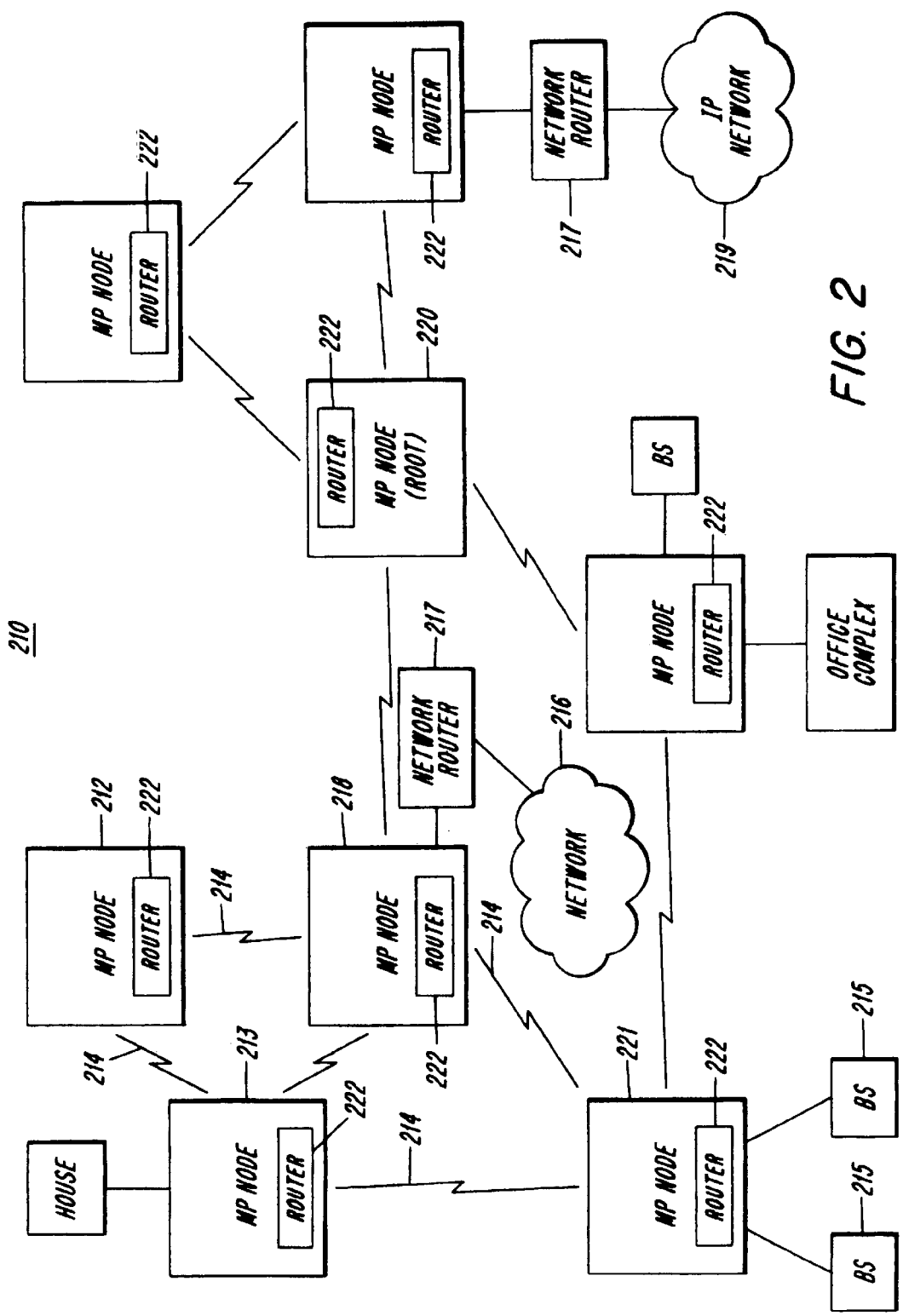
FIG. 2 illustrates a multi-point to multi-point communication system according to exemplary embodiments of the present invention.

FIG. 2 illustrates a multi-point to multi-point communication system 210 according to exemplary embodiments of the present invention. The communication system 210 includes multiple multi-point (MP) nodes (e.g., MP nodes 212, 213, 218, 220, 221). Each MP node includes a transmitter, a receiver, and a router 222 which assists the MP nodes in routing packets to neighboring MP nodes based on the intended destination of the packets. Some MP nodes (e.g., MP node 218) are connected to a network 216 (e.g., an IP network) via a network router 217. Other MP nodes (e.g., MP node 221) are connected to one or multiple base stations (BS) 215 for communication with wireless communication devices such as radio telephones. In addition, MP nodes can be connected to houses or office complexes or any other fixed location that would desire IP communications. In an exemplary embodiment of the present invention, each MP node includes several sector antennas which, combined, cover a 360 degree radius around the MP node. In general, a sector antenna is designed to transmit and receive radio energy to and from a particular geographic region or sector within a corresponding cell. By restricting the sector antenna to a particular sector, interference emanating from sources located outside the sector is minimized. This, in turn, improves the signal quality between the MP nodes and other wireless devices that may be operating in that sector of the cell. An MP node can employ multiple sectors (e.g., 1–18 sectors) with each sector covering a proportional area. For example, an MP node may employ three sector antennas, each covering one of three 120 degree sectors. Alternatively, an MP node may employ six sector antennas, each covering one of six 60 degree sectors. In addition, an MP node may employ eighteen sector antennas, each covering one of eighteen 20 degree sectors.

MP nodes communicate with each other over wireless links 214. Any MP node can directly communicate with any other MP node as long as it is in range of its antenna For example, MP node 213 can communicate directly with MP nodes 212, 218, and 221. In addition, each MP node broadcasts its node identification (ID) and sector ID over a broadcast channel. Each MP node maintains a link routing table for each sector (see FIG. 4) which is updated periodically (e.g., 5–100 times a second). The link routing table is stored, for example, in a memory such as a RAM, EEPROM, magnetic media, or other known writeable storage device. The link routing table stores the identity and link quality of the available sectors for neighboring MP nodes. Each time the link routing table is updated, the MP node transmits a copy of the link routing table to a root MP node 220. The root MP Node 220 maintains a master link routing table (see FIG. 5) which stores the information contained in each of the link routing tables from each of the MP nodes. The root node analyzes the information contained in the master link routing table and transmits routing information over a broadcast channel to all of the MP nodes so that the routers 217, 222 of the communication system 210 can be constantly updated by providing to all of the MP nodes a current routing map or "picture" of the entire communication system 210. This constant updating allows the routers 217, 222 to route packets efficiently while taking advantage of new MP nodes and routing around inactive or malfunctioning MP nodes.

In an exemplary embodiment of the present invention, new MP nodes are added to the communication system 210. This may occur in response to anticipated increased demand, for example, during a stadium event or at a disaster site where there is a sudden and unexpected increase in packet traffic due to the presence of emergency and media personnel. During such an event, a new MP node, for example, may be installed on either a moving or stationary vehicle. When a new MP node is placed in the communication system 210, the system 210 automatically reconfigures itself to recognize and take advantage of the new node.

Figure 3:
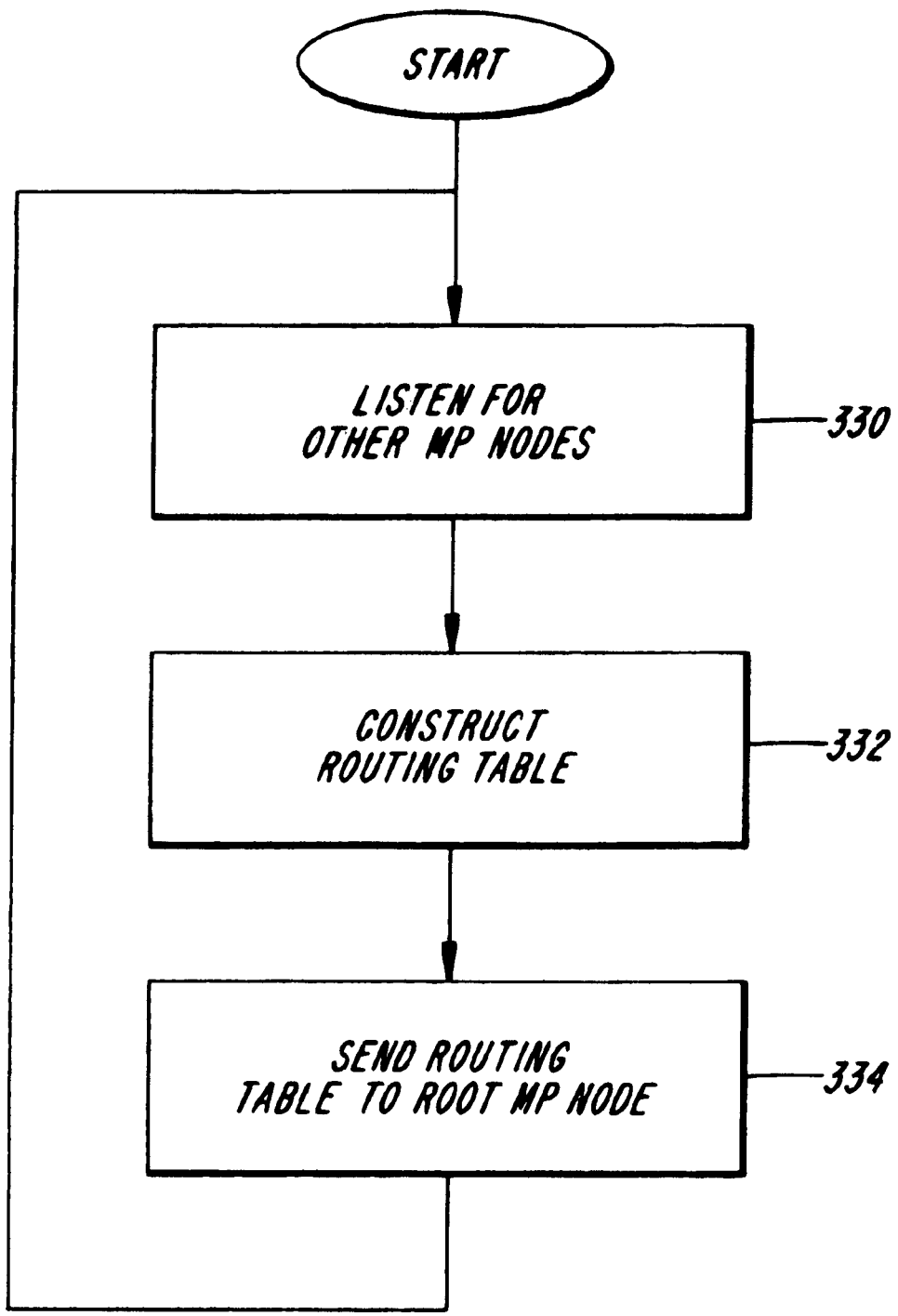
FIG. 3 is a flow chart of an exemplary method of the present invention.

With reference to FIGS. 3 & 4, in step 330, each sector of the new MP node listens for the node IDs and sector IDs of neighboring MP nodes. In step 332, a link routing table is constructed for each sector which includes an MP Node ID field, a Sector ID field, and a Link Quality field. For purposes of illustration, the Link Quality field includes values of HIGH, MEDIUM, and LOW. One skilled in the art will recognize that more precise link quality measurements may be stored in the link routing table, such as, a link quality measurement in decibels (dB) or watts, or bit error rate (BER) measurements. Examples of a HIGH, MEDIUM, and LOW link quality are BERs in the order of $10^{-9}$, $10^{-8}$, and $10^{-7}$, respectively. Once the link routing table is constructed, in step 334, the link routing table is sent to the root MP node 220. The root MP node 220 uses the link routing table sent in step 334 to update its master link routing table (see FIG. 5). The master link routing table is used to create routing information used by the routers 217, 222 which is transmitted over a broadcast channel so that packets can be properly and efficiently routed throughout the communication system 210. The process of FIG. 3 is repeated periodically in order to maintain an updated routing map of the entire communication system 210. One of ordinary skill in the art will recognize that the frequency of the updating of the link routing tables will depend on the expected frequency of changes to the communication system 210. For example, a communication system that has moving nodes, or that has frequent temporary nodes may need to update its link routing tables more frequently than a communication system that does not have changes to the location of its nodes as frequently.

In an alternative embodiment of the present invention, an MP node can be mounted to a mobile vehicle such as an automobile, train, plane, or ship, so that the mobile vehicle can be provided with IP communications. Since the link routing table is updated on a frequent basis, the communication system 210 will be able to dynamically adapt to the frequent movement of the MP node within the communication system 210.

The foregoing has been described the principles, preferred embodiments and modes of operation of the present invention. However, the invention should not be construed as being limited to the particular embodiments discussed above. While the above-described embodiments were provided using LMDS, one skilled in the art will appreciate that the present invention may be practiced in any of a number of different protocols such as Local Multi-point Communication System (LMCS), Code Division Multiple Access (CDMA), Frequency Division Multiple Access (FDMA), Time Division Duplex (TDD), etc. Thus, the above-described embodiments should be regarded as illustrative rather than restrictive, and it should be appreciated that variations may be made in those embodiments by workers skilled in the art without departing from the scope of the present invention as defined by the following claims.

What is claimed is:

1. A wireless multi-point to multi-point communication system comprising:
    a plurality of multi-point nodes, wherein each of said multi-point nodes is associated with one or more antennas operative to transmit or receive within one or more geographical sectors associated with said multi-point node, and wherein each of said plurality of said multi-point nodes includes:
    a transmitter that broadcasts over at least one sector;
    a receiver that receives broadcasts over said at least one sector;
    a router; and
    a memory, wherein at least one sector identifier, each corresponding to a single said at least one sector, is stored in said memory and broadcast over a respective said at least one sector, and wherein a routing table is stored in said memory and informs said multi-point node of available communication paths for said multi-point node based on receipt of at least one sector identifier from another one of said plurality of multi-point nodes; and
    wherein said system further comprises a root multi-point node that communicates with at least one of said plurality of multi-point nodes, said root multi-point node including:
        a memory, wherein said at least one sector identifier is stored in said memory and communicated to said at least one of said plurality of multi-point nodes, and wherein a root node routing table is stored in said memory that includes contents of routing tables from all of the plurality of multi-point nodes.

2. The system of claim 1, wherein said root multi-point node also includes:
    a transmitter that broadcasts over at least one sector;
    a receiver which receives broadcasts over said at least one sector; and
    a root router.

3. The system of claim 2, wherein said root node routing table is used to inform said root router of all available communication paths for said communication system.

4. The system of claim 1, wherein said system is a Local Multipoint Distribution Service system.

5. The system of claim 1, wherein said system is a Local Multipoint Communication System.

6. The system of claim 1, wherein at least one of said plurality of multi-point nodes further comprises at least six sector antennas corresponding to at least six sectors.

7. The system of claim 1, wherein at least one of said plurality of multi-point nodes further comprises at least eighteen sector antennas corresponding to at least eighteen sectors.

8. The system of claim 1, wherein said router directs communication packets to at least one additional multi-point node based on an intended destination of said packet and said available communication paths stored in said routing table.

9. The system of claim 1, wherein each of said plurality of multi-point nodes broadcasts said routing table to said root multi-point node.

10. The system of claim 1, wherein said root multi-point node broadcasts routing information to each of said routers in said plurality multi-point nodes.

11. The system of claim 1, wherein at least one of said plurality of multi-point nodes is connected to a base station.

12. The system of claim 1, wherein at least one of said plurality of multi-point nodes is connected to a remote network router.

13. The system of claim 12, wherein said remote network router is connected to an IP network.

14. A wireless multi-point node, said multi-point node being associated with one or more antennas operative to transmit or receive within one or more geographical sectors associated with said multi-point node, said wireless multi-point node comprising:
    a transmitter that broadcasts over at least one sector;
    a receiver which receives broadcasts over said at least one sector, a router; and
    a memory,
    wherein at least one sector identifier each corresponding to a single at least one sector is stored in said memory and broadcast over a corresponding said at least one sector,
    wherein said receiver receive at least one sector identifier each corresponding to a sector of another multi-point node, and
    wherein a routing table, based on receipt of said at least one sector identifier, is stored in said memory and informs said multi-point node of available communication paths for said multi-point node.

15. The multi-point node of claim 14, wherein said multi-point node operates in a Local Multipoint Distribution Service system.

16. The multi-point node of claim 14, wherein said multi-point node operates in a Local Multipoint Communication System.

17. The multi-point node of claim 14, wherein said multi-point node further comprises at least six sector antennas corresponding to at least six sectors.

18. The multi-point node of claim 14, wherein said multi-point node further comprises at least eighteen sector antennas corresponding to at least eighteen sectors.

19. The multi-point node of claim 14, wherein said router directs communication packets to at least one additional multi-point node based on an intended destination of said packet and said available communication paths stored in said routing table.

20. The multi-point node of claim 14, wherein said multi-point node broadcasts said routing table to a root multi-point node.

21. The multi-point node of claim 14, wherein said multi-point node is connected to a base station.

22. The multi-point node of claim 14, wherein said multi-point node is connected to a remote network router.

23. The multi-point node of claim 22, wherein said remote network router is connected to an IP network.

24. A method for communicating in a wireless multi-point network, said network including a plurality of wireless multi-point nodes, each of said multi-point nodes being associated with one or more antennas operative to transmit or receive within one or more geographical sectors associated with said multi-point node, said method comprising the steps of:

maintaining a routing table in each of said plurality of multi-point nodes, wherein said routing table includes a sector identifier and a link quality field of all sectors of neighboring multi-point nodes which have a link quality above a predetermined threshold;

transmitting each of said routing tables for each of said plurality of multi-point nodes to a root multi-point node.

25. The method of claim 24, wherein said method further comprises the step of:

maintaining a root routing table that includes contents of each of said routing tables; and broadcasting a master routing table based on said root routing table to said plurality of multi-point nodes.

26. The method of claim 24 wherein said maintaining and broadcasting steps are repeated periodically.

27. The method of claim 24 wherein said maintaining and broadcasting steps are repeated 5–100 times a second.

28. The method of claim 24, wherein said network is a Local Multipoint Distribution Service network.

29. The method of claim 24, wherein said network is a Local Multipoint Communication System network.

30. The method of claim 24, wherein at least one of said plurality of multi-point nodes includes at least six sectors.

31. The method of claim 24, wherein at least one of said plurality of multi-point nodes further includes at least eighteen sectors.

32. The method of claim 24, wherein at least one of said plurality of multi-point nodes is connected to a base station.

33. The method of claim 24, wherein at least one of said plurality of multi-point nodes is connected to a remote network router.

34. The method of claim 33, wherein said remote network router is connected to an IP network.

35. The method of claim 33, wherein said method further comprises the step of:

directing communication packets from one multi-point node to another multi-point node based on an intended destination of said packet and said available communication paths stored in said routing table in at least one of said plurality of multi-point nodes.

36. A method of operating a wireless multi-point node, wherein said multi-point node is associated with one or more antennas operative to transmit or receive within one or more geographical sectors associated with said multi-point node, said method comprising the steps of:

receiving a signal from at least one sector of at least one other wireless multi-point node;

measuring a link quality of said received signal;

storing, in a routing table, a sector identifier and a link quality value identifying said at least one sector if said link quality exceeds a predetermined threshold value; and sending said routing table to a root multi-point node.

37. The method of claim 36 wherein said measuring, storing, and sending steps are repeated periodically.

38. The method of claim 36 wherein said measuring, storing, and sending steps are repeated periodically 5–100 times a second.

39. The method of claim 36, said method further comprising the step of:

receiving, from said root multi-point node, contents of routing tables from a plurality of multi-point nodes.

40. The method of claim 36, said method further comprising the step of:

routing packets from said multi-point node to said at least one other multi-point node based on said routing table.

41. The method of claim 36, said method further comprising the step of:

receiving contents of other routing tables corresponding to at least one other multi-point node; and routing packets from said multi-point node to said at least one other multi-point node based on said routing table and said contents of said other routing tables.

42. The method of claim 36, wherein said multi-point node includes at least six sectors.

43. The method of claim 36, wherein said multi-point node Includes at least eighteen sectors.

44. The method of claim 36, wherein said multi-point node is connected to a base station.

45. The method of claim 36, wherein said multi-point node is connected to a remote network router.

46. The method of claim 45, wherein said remote network router is connected to an IP network.

\* \* \* \* \*